Dec. 16, 1947.  A. C. WENZEL  2,432,958
NAVIGATION INSTRUMENT
Filed Dec. 13, 1943  3 Sheets-Sheet 1

Inventor:
Alfred C. Wenzel,
By Dawson, Ooms & Booth,
Attorneys.

Dec. 16, 1947.  A. C. WENZEL  2,432,958
NAVIGATION INSTRUMENT
Filed Dec. 13, 1943  3 Sheets-Sheet 2
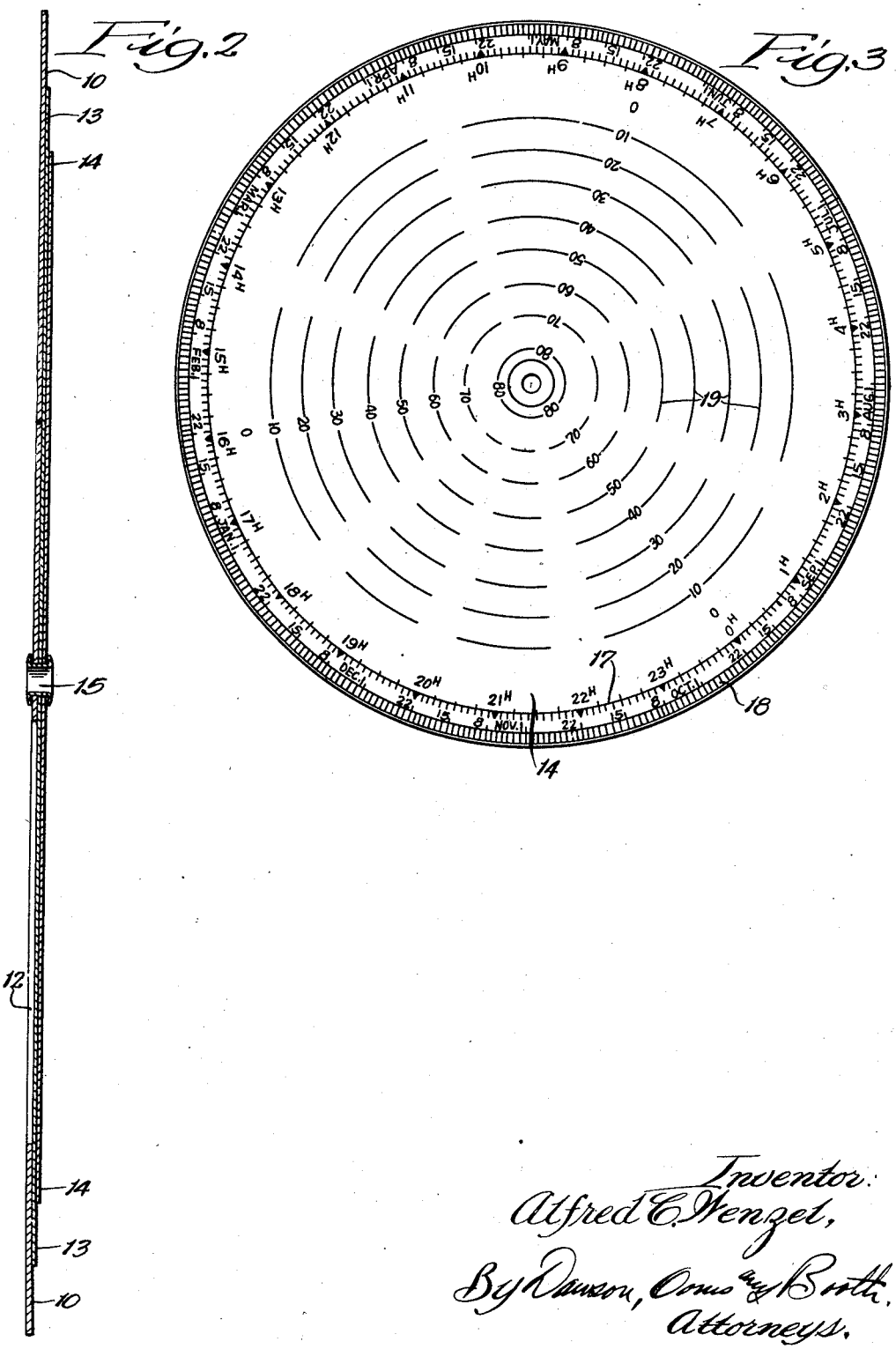

Dec. 16, 1947. A. C. WENZEL 2,432,958
NAVIGATION INSTRUMENT
Filed Dec. 13, 1943 3 Sheets-Sheet 3

Inventor:
Alfred C. Wenzel,
By Dawson, Ooms & Booth
Attorneys.

Patented Dec. 16, 1947

2,432,958

UNITED STATES PATENT OFFICE 2,432,958

NAVIGATION INSTRUMENT

Alfred C. Wenzel, Chicago, Ill., assignor to Republic Flow Meters Company, Chicago, Ill., a corporation of Illinois Application December 13, 1943, Serial No. 514,189

2 Claims. (Cl. 33—61)

This invention relates to navigation instrument and more particularly to an instrument for indicating the latitude and longitude of an observation point.

It has heretofore been the usual practice to determine the latitude and longitude of an observation point by celestial observations. This practice has required relatively complex instruments and careful calculations or reference to involved navigation tables in order to determine the longitude and latitude from the observations. In many cases, the apparatus necessary for making the observations and the tables for converting such observations into terms of latitude and longitude are not available. Furthermore, such determinations require a substantial knowledge of astronomy.

It is accordingly one of the objects of the present invention to provide a navigation device which can be operated to determine latitude and longitude by a relatively unskilled operator.

Another object of the invention is to provide a navigation device which will give direct indications of latitude and longitude without the necessity for involved calculations or reference to tables.

The above and other objects and advantages will be more readily apparent from the following description when read in connection with the accompanying drawing, in which—

Figure 2 is a central section on the line 2—2 of Figure 1;

Figure 3 is a plan view of one of the discs; and

The device as shown, comprises a first sheet 10 which may be of opaque material and which is provided with a reference line 11 extending radially from a central point thereon. Preferably, a portion of the reference line 11 is formed by a relatively narrow slot 12 through the sheet.

Figure 1:
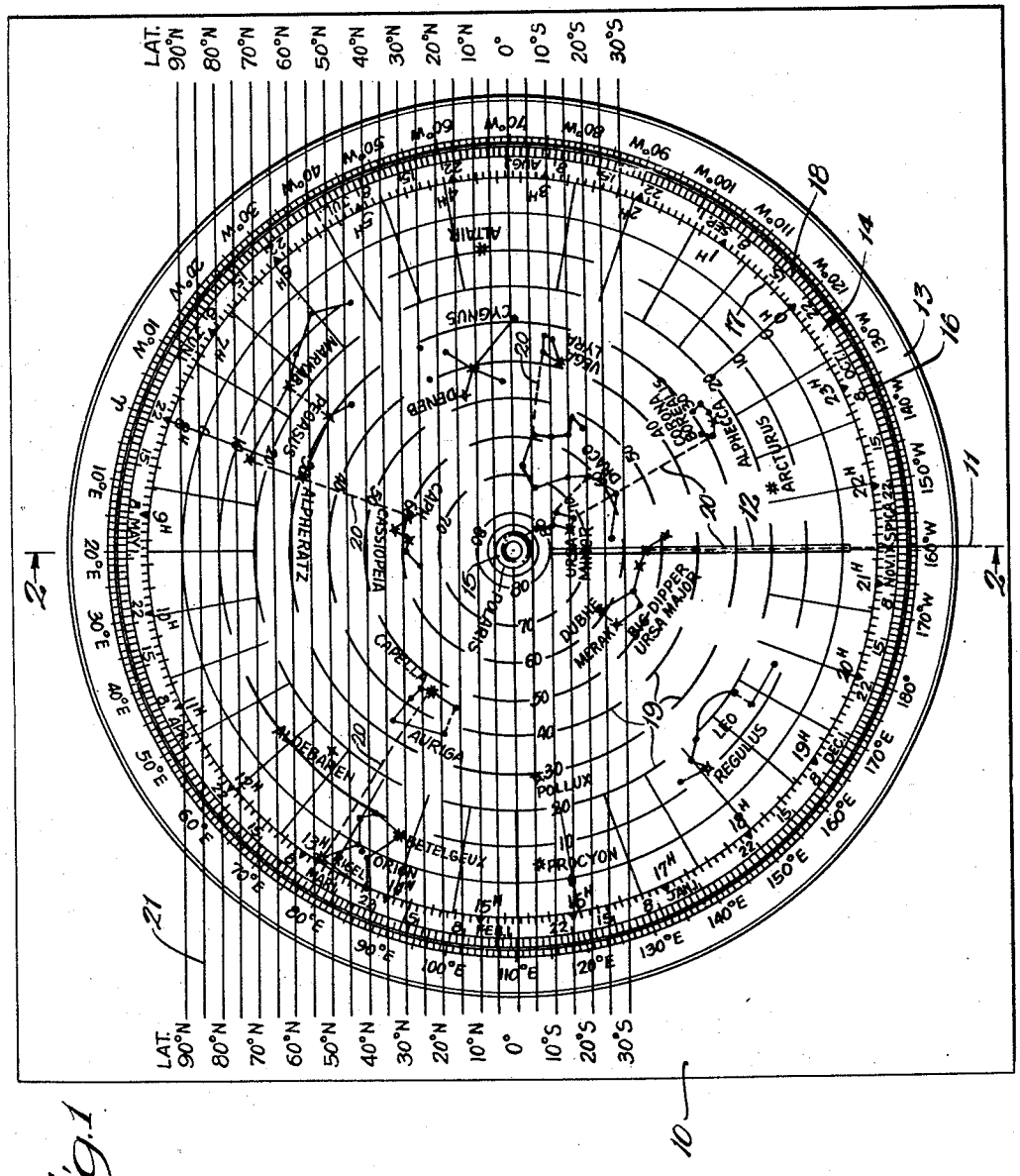
Figure 1 is a plan view of a navigation device embodying the invention.
Figure 4:
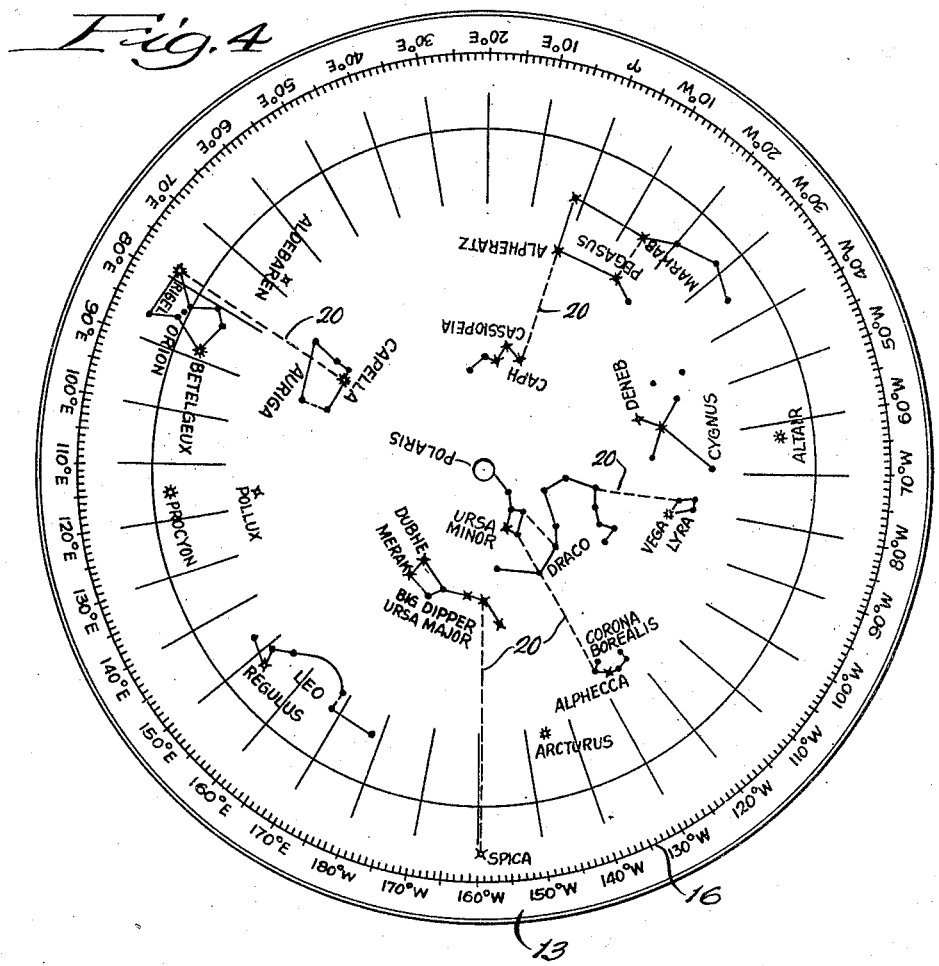
Figure 4 is a similar view of another of the discs.

A pair of sheets or discs 13 and 14 formed of transparent material are rotatably mounted on the sheet 10 by a rivet or the like 15 extending through the central point on the sheet. The disc 13 as shown in Figure 4 carries a representation of a number of readily identifiable stars arranged in the form of a flat polar projection of the heavens with the central point about which the disc is rotatable on the rivet 15 corresponding to the location of the pole star. It will be understood that any desired number of stars, preferably those forming the better known constellations, can be represented on the disc. The disc is calibrated around its periphery with a circular scale 16 graduated in terms of degrees longitude. The disc 13 is preferably mounted next adjacent the sheet 10 as shown.

The disc 14 is mounted above the disc 13 and is calibrated around its periphery with two scales indicating respectively the hour of the day and the days of the year. As shown in Figure 3, the scale 17 which is the radially innermost scale is calibrated in terms of twenty-four hours and the outermost scale 18 is calibrated in terms of days of the year. If desired, a series of concentric arcuate lines 19 may be carried on the disc indicating degrees declination. The lines 19 will show the latitude of the several stars or constellations on the disc 13.

To determine the longitude of an unknown observation point by the use of this instrument it is necessary only that the observer know the time and the date. The time must be known in terms of Greenwich civil time or if the zone time is known, the correction to Greenwich time must also be known. With these factors known, a star must be selected which can be identified on the chart and which is or will shortly be directly overhead. By "overhead" as used herein it is meant that the star and the observer are both in the same plane through the earth's axis. When the selected star is directly overhead, the time should be noted. The slit 12 in the opaque sheet 10 is provided to assist in determining when the selected star is overhead since with the device held in a horizontal plane directly above the eye of the observer the selected star will be overhead when both it and the pole star can be seen through the slot. In the event that the observation point is too far south to see the pole star, it is possible to use for observation pairs of visible stars which are aligned with the pole. Such stars are shown connected on the disc 13 by dotted lines 20.

When the selected star is observed to be directly overhead, the time is noted and the disc 13 is turned until the representation of the selected star is directly over the reference line 11 or the slot 12. The disc 14 is then turned until the time at which the observation was made Greenwich civil time also lies over the reference line 11 or slit 12. Longitude may now be read directly on the scale 16 opposite the date at Greenwich on the scale 18.

To determine latitude the sheet 10 is provided with a scale 21 extending at right angles to the reference line 11 and calibrated in degrees latitude. After the longitude observation has been made as described above, latitude can be determined by selecting any identifiable star which is relatively close to the horizon to the west of the observer. When such star just touches the horizon as seen by the observer, the time should again be noted. Both discs 13 and 14 are then turned simultaneously until the newly noted time is over the reference line at which time the observed star will indicate on the scale 21 the latitude of the observation point. It would be possible to utilize the same star for both longitude and latitude observations but this would involve a wait of several hours until the star disappeared below the horizon. It is, therefore, preferred to determine latitude by observing a second star which is closer to the horizon so that it is not necessary to wait any great length of time before making the latitude determination. It will be noted that one method is as accurate as the other since the angle between the stars remains fixed.

By the use of the present invention latitude and longitude of any point from which stars indicated on the chart are visible can be accurately and quickly determined without any special knowledge of astronomy or the principles of navigation.

While one embodiment of the invention has been shown and described in detail herein, it is understood that these are illustrative only and are not to be taken as a definition of the scope of the invention, reference being had for this purpose to the appended claims.

What is claimed is:

1. A navigation instrument comprising a flat sheet of opaque material having a narrow slot therein extending radially from a central pivot point, a pair of transparent discs rotatably secured to the sheet at the pivot point, one of the transparent discs having a flat polar projection of stars thereon with the pivot point corresponding to the pole star, and the edges of the transparent discs being circularly calibrated in terms of hours of the day, days of the year and degrees longitude, two of said calibrations being on one of the discs and the third calibration being on the other disc.

2. A navigation instrument comprising a flat sheet of opaque material having a narrow slot therein extending radially from a central pivot point, a pair of transparent discs rotatably secured to the sheet at the pivot point, one of the transparent discs having a flat polar projection of stars thereon with the pivot point corresponding to the pole star, and the edges of the transparent discs being circularly calibrated in terms of hours of the day, days of the year and degrees longitude, with two of the calibrations on one disc and the third calibration on the other disc, and the sheet having thereon a series of lines crossing the slot and spaced apart in terms of degrees latitude.

ALFRED C. WENZEL.

REFERENCES CITED

The following references are of record in the file of this patent:

UNITED STATES PATENTS

| Number | Name | Date |
|---|---|---|
| 515,195 | Cowell | Feb. 20, 1894 |
| 1,145,020 | Hill | July 6, 1915 |
| 1,325,877 | Marden | Dec. 23, 1919 |
| 2,064,917 | Jensen | Dec. 22, 1936 |
| 2,190,281 | Berg | Feb. 13, 1940 |
| 2,203,194 | Frazier | June 4, 1940 |